(12) United States Patent
Salsi et al.

(10) Patent No.: US 10,110,320 B2
(45) Date of Patent: Oct. 23, 2018

(54) METHOD FOR MONITORING AND CORRECTION OF ADJACENT CHANNEL PENALTY IN COHERENT OPTICAL TRANSMISSION

(71) Applicant: Juniper Networks, Inc., Sunnyvale, CA (US)

(72) Inventors: Massimiliano Salsi, Sunnyvale, CA (US); Xiaoxia Wu, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 15/462,279

(22) Filed: Mar. 17, 2017

(65) Prior Publication Data

US 2018/0269984 A1    Sep. 20, 2018

(51) Int. Cl.
*H04B 10/00* (2013.01)
*H04B 10/61* (2013.01)
*H04B 10/079* (2013.01)
*H04J 14/00* (2006.01)

(52) U.S. Cl.
CPC ..... *H04B 10/6164* (2013.01); *H04B 10/0795* (2013.01)

(58) Field of Classification Search
CPC ............ H04B 10/0773; H04B 10/0775; H04B 10/0793; H04B 10/0795; H04B 10/07957; H04B 10/572
See application file for complete search history.

(56) References Cited

U.S. PATENT DOCUMENTS

2016/0226683 A1* 8/2016 Zhao ................... H04L 27/0006

* cited by examiner

*Primary Examiner* — Daniel Dobson
(74) *Attorney, Agent, or Firm* — Cooley LLP

(57) ABSTRACT

In some embodiments, an apparatus includes a processor configured to receive a set of digital samples associated with a set of optical signals received at a coherent optical receiver. The set of digital samples is associated with a set of optical channels. Each optical channel from the set of optical channels is spaced from at least one adjacent optical channel from the plurality of optical channels. The processor is configured to calculate, for each optical channel from the set of optical channels, a spacing between that optical channel and at least one adjacent optical channel from the set of optical channels based on digital signal processing of the set of digital samples. The processor is configured to send a signal indicating, for each optical channel from the set of optical channels, the spacing between that optical channel and the at least one adjacent optical channel.

17 Claims, 7 Drawing Sheets
(2 of 7 Drawing Sheet(s) Filed in Color)

METHOD FOR MONITORING AND CORRECTION OF ADJACENT CHANNEL PENALTY IN COHERENT OPTICAL TRANSMISSION

FIELD

One or more embodiments relate to the method of monitoring and correcting adjacent channel penalty in coherent optical transmission systems.

BACKGROUND

With the significant rise in the use of the optical communications, the number of channels within a fixed frequency range has also been rising. One of many solutions implemented to accommodate growing number of channels is the reduction of the spacing between two adjacent channels. For example, in the last few years 50 GHz channel spacing was common; now, the channel spacing of 37.5 GHz or less is desirable. Decreased channel spacing allows for increased spectral efficiency and the new optical channels within the saved spectrum. One of the disadvantages of decreasing the channel spacing, however, includes a reduced ratio of the channel spacing to the channel baud rate. This reduced ratio leaves a reduced margin for misalignment errors (particularly, with respect to laser central frequency errors).

The lasers in the optical communication system typically exhibit drift in their frequency, for example around ±1.8 GHz. This drift in the laser frequency is often sufficient to produce a large bit-error rate (BER) penalty in the optical communication system. Known coherent optical transmitters/receivers do not have an internal mechanism to monitor drift in the channel spacing. The known monitoring methods use an externally-connected instrument(s) such as optical spectrometer.

Accordingly, a need exists for a method to monitor digitally and correct the spacing between the adjacent channels in the coherent optical transmission systems.

SUMMARY

In some embodiments, an apparatus includes a processor configured to receive a set of digital samples associated with a set of optical signals received at a coherent optical receiver. The set of digital samples is associated with a set of optical channels. Each optical channel from the set of optical channels is spaced from at least one adjacent optical channel from the plurality of optical channels. The processor is configured to calculate, for each optical channel from the set of optical channels, a spacing between that optical channel and at least one adjacent optical channel from the set of optical channels based on digital signal processing of the set of digital samples. The processor is configured to send a signal indicating, for each optical channel from the set of optical channels, the spacing between that optical channel and the at least one adjacent optical channel.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Fiber-optic communication is commonly used presently due to its large data bandwidth and fast data transfer. One commonly-implemented method to increase data bandwidth is wavelength division multiplexing (WDM) (or Dense WDM (DWDM)), which is used to multiplex data from different optical sources together on each optical fiber, with each optical signal having its own separate light wavelength. The continuously growing network traffic involves trying to accommodate more channels in the same fiber optic. As a result, to provide large network capacity, the optical channels density has increased.

In a very dense WDM system, however, the fluctuations in the laser frequency (and thus the center frequencies of the various optical channels) can increase the channel cross-talk penalty. The fluctuations in the frequency of the laser (and the center frequencies of the various optical channels) are referred to as laser frequency drift. To avoid the channel cross-talk penalty, the coherent receiver system described herein can determine the laser frequency drift through estimating the spacing between adjacent optical channels. Once the drift in the center frequency for one or more optical channels is determined, then the coherent receiver system provides the coherent transmitter system with the appropriate feedback. On receiving the feedback, the optical transmitter system offsets the center frequency for the one or more optical channels to mitigate or overcome the channel cross-talk penalty.

Figure 1:
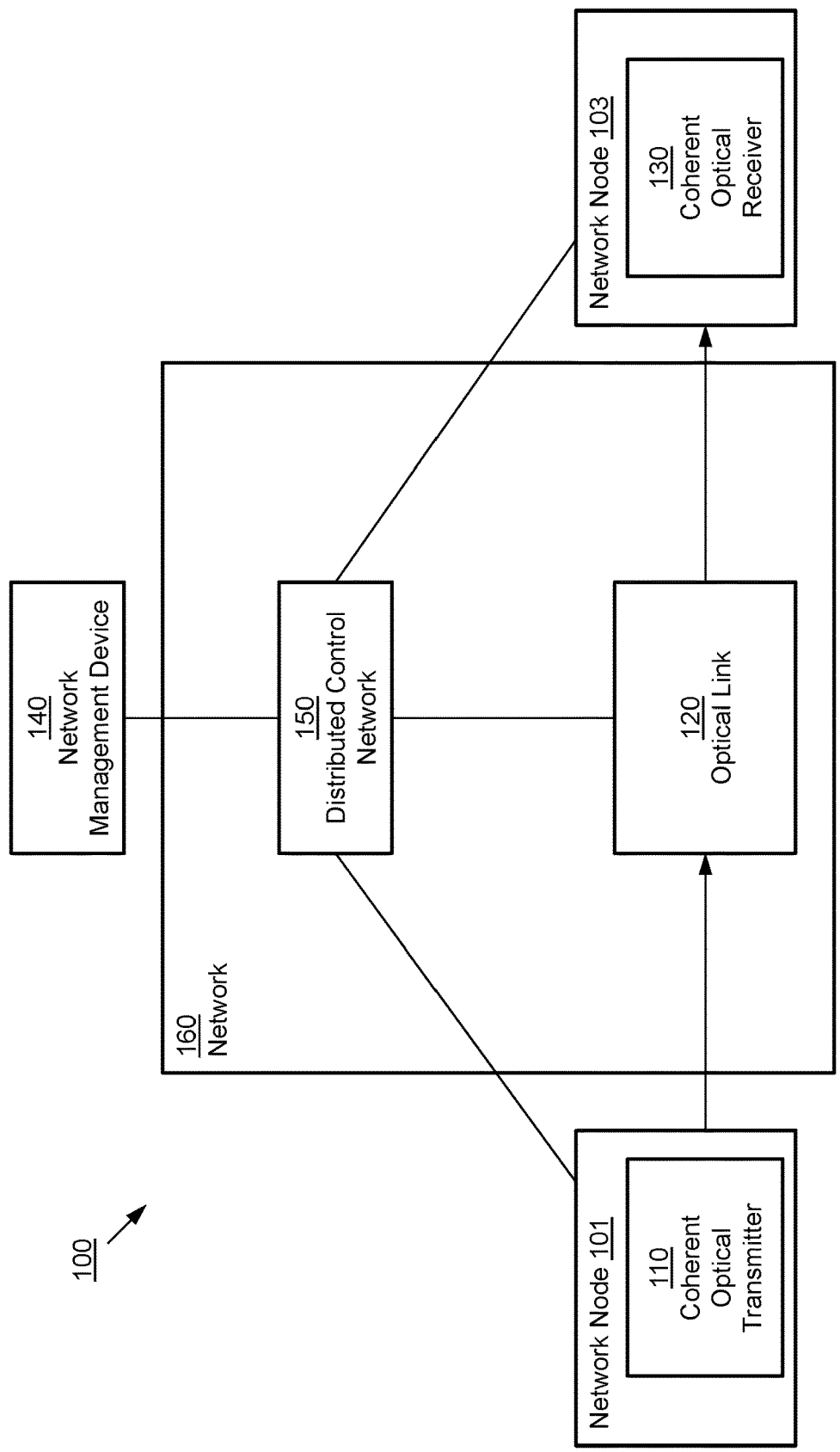
FIG. 1 is a logical block diagram of a coherent optical communication system, according to an embodiment.

FIG. 1 is a logical block diagram of a coherent optical communication system 100, according to an embodiment. The coherent optical communication system 100 includes a network node 101 having a coherent optical transmitter 110, and a network node 103 having a coherent optical receiver 130. As shown in FIG. 1, network nodes 101 and 103 are each communication endpoints of the network 160. Network node 101 and network node 103 are connected together by one or more connections of network 160 such as an optical link 120. For example, the coherent optical transmitter 110 can transmit data in the form of optical signals through the optical link 120, which is included within optical communication network 160.

Optical communication network 160 can include, for example, a wavelength division multiplex (WDM) communication network. Many optical signals are multiplexed together and transmitted via optical communication channels (also referred to herein as optical channels) through the optical link 120. The optical link 120 can be, for example, a physical connection including communication media such as optical fiber (not shown in FIG. 1). A WDM communication network can include multiple optical channels each having its own bandwidth and pre-determined channel spacing from the two adjacent optical channels. Optical signals can be transmitted within these optical channels to link together the coherent optical transmitter 110 and the corresponding coherent optical receiver 130. The coherent optical receiver 130 receives these optical channels through the optical link 120, which are later processed by the coherent optical receiver 130 (as discussed below).

A network management device 140 is connected to the coherent optical receiver 130 and the coherent optical transmitter 110 via network 160 and/or distributed control network 150. The network management device 140 manages one or more functions of optical communications within the coherent optical communication system 100. For example, at the coherent optical transmitter 110, the spacing between two optical channels being transmitted over the optical link 120 can be adjusted based on signals determined by and received from the network management device 140. For the coherent optical receiver 130, the spacing between two optical channels can analyzed by the network management device 140 and that spacing information can be used by the network management device 140 to determine and send the adjustment signals to the coherent optical transmitter 110. In other words, the network management device 140 can analyze the spacing at the coherent optical receiver 130 to provide feedback of the received channel spacing to the coherent optical transmitter 110.

The network management device 140 can be a part of or operatively coupled to the distributed control network 150. The distributed control network 150 can have portions or elements located in and distributed among various devices and nodes of the network 160 and network nodes 101 and 103. In other words, one or more devices and nodes of the network 160 and/or network nodes 101 and 103 can include software (stored in memory or implemented hardware) and/or hardware (such as a processor) that manages control functions including functions directed by network management device 140. In other words, the network management device 140 can receive and transmit control signal(s) through the distributed control network 150, which is operatively coupled to the coherent optical transmitter 110, optical link 120 and/or coherent optical receiver 130 to affect their control functions.

Although FIG. 1 shows coherent optical transmitter 110 as a transmitter alone, it should be understood that the coherent optical transmitter 110 may be replaced with a coherent optical transceiver for duplex communication without departing away from the scope of the disclosure. Similarly, although FIG. 1 shows coherent optical receiver 130 as a receiver alone, it should be understood that the coherent optical receiver 130 may be replaced with a coherent optical transceiver for duplex communication without departing away from the scope of the disclosure. In addition, although FIG. 1 shows only one each of coherent optical transmitter 110, coherent optical receiver 130 and network management device 140, it should be understood that any number of such devices is possible. Similarly, although a single optical link 120 is shown in FIG. 1, it should be understood that the optical link 120 can be included within a network that includes one or more optical networks and that may include one or more non-optical networks as well.

Figure 2:
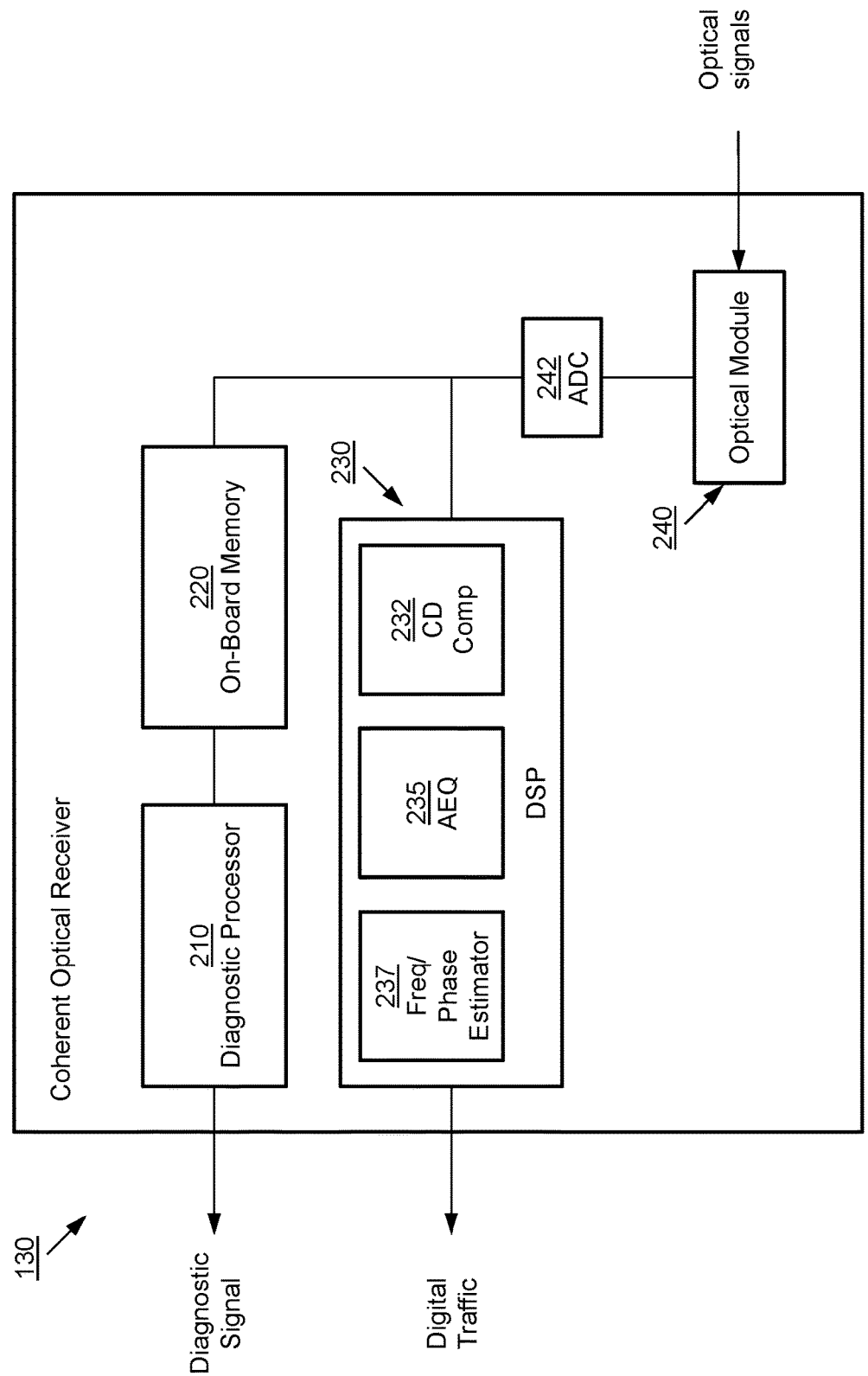
FIG. 2 is a logical block diagram of a coherent optical receiver, according to an embodiment.

FIG. 2 is a logical block diagram for the coherent optical receiver, according to an embodiment. The coherent optical receiver 130 includes a diagnostic processor 210, an on-board memory 220, a digital signal processor (DSP) 230, an optical module 240, and an internal analog-to-digital converter (ADC) 242. The DSP 230 further includes a chromatic dispersion compensation (CD comp) unit 232, an adaptive equalizer (AEQ) 235 and a frequency/phase estimator 237.

The coherent optical receiver 130 is part of an optical communication system such as coherent optical communication system 100 shown in FIG. 1, which can be implemented as a WDM communication system. The coherent optical receiver 130 can receive optical signals and estimate the relative frequency offset of the neighboring channels of the received optical signals. The coherent optical receiver 130 can then transmit an indication of the estimated frequency offset to the network management device 140 via distributed control network 150, and then network management device 140 can provide control signals to the coherent optical transmitter 110 via the distributed control network 150. The coherent optical transmitter 110 can then carry out the desired steps to adjust the carrier frequency of a single optical channel and/or multiple optical channels in the spectrum based on the control signals.

Optical signals are received in the optical module 240 of the coherent optical receiver 130. The optical module 240 detects the received optical signals (labelled as 'optical signals' in FIG. 2) from the optical communication network (such as network 160 in FIG. 1) and converts the optical signal into corresponding digital samples for further processing. More specifically, the optical module 240 includes a coherent frontend receiver (not shown in FIG. 2) having an optical detector (not shown) that detects the received optical signals to produce digital signals. The coherent frontend receiver also includes a local oscillator (not shown in FIG. 2) that generates an intermediate frequency (IF) signal as a reference. The detected digital signals and IF signal are mixed to produce mixed signals. Depending on the value of IF of the IF signal, a coherent detection receiver can be classified as homodyne, intradyne or heterodyne receiver. The optical module 240 further sends the mixed signals to an ADC 242.

The ADC 242, which is bandwidth limited, can convert the detected mixed signals (which are analog electrical signals) into corresponding digital signals (also referred to herein as digital samples). After conversion by the ADC 242, the digital electrical signals are then transmitted to the DSP 230, which includes chromatic dispersion compensation (CD comp) unit 232. CD comp 232 performs chromatic dispersion filtering of the received digital electrical signals. The output of CD comp 232 is then passed to the adaptive equalizer (AEQ) 235. AEQ 235 performs channel equalization as the power level of the individual optical channels changes over time, and AEQ 235 sends the power-equalized signals associated with each optical channel to the frequency/phase estimator unit 237. The frequency/phase estimator unit 237 determines an offset between the carrier frequency of the received optical signals and the frequency generated by the local oscillator (discussed above) of the coherent optical receiver 130. The frequency/phase estimator unit 237 can estimate a frequency offset, for example, caused by distortion effects on the optical channel during transmission or caused due to fluctuations in the center frequency of the optical source 310 (and/or related center frequencies of the optical channels) such as a laser at the coherence optical transmitter (described below in reference to FIG. 3) and the local oscillator at the coherent optical receiver 130. The optical frequency (or wavelength) of the local oscillator in the coherent optical receiver 130 is used as reference frequency (or wavelength) in determining the carrier frequency offset, which can be compensated for latter. After processing by the frequency/phase estimator 237, the output of DSP 230 is the digital traffic, corresponding to the digital traffic sent by the coherent optical transmitter (such as coherent optical transmitter 11). In sum, the DSP 230 performs various types of compensation to recover the digital traffic sent by the sending coherent optical transmitter and one such type of compensation is the estimation of the carrier frequency of the corresponding received optical channels after transmission through the optical link 120.

In some implementations, the Diagnostic processor 210 can be operatively coupled to DSP 230 and receive a signal that represents the carrier frequency offset as determined by the frequency/phase estimator 237. The carrier frequency offset information can then be used by diagnostic processor 210 to compensate for the carrier frequency offset when performing other calculations such as Fast Fourier Transformation (FFT) described below to calculate channel spacing.

The diagnostic processor 210 can analyze the distance (channel spacing) of the adjacent optical channels from the optical channel under test. The diagnostic processor 210 can perform this analysis by using digital signal processing implementing mathematical computation techniques such as Fast Fourier Transformation (FFT). These mathematical computation techniques can be implemented by diagnostic processor 210 as software (stored in memory and/or executing on a processor) and/or hardware. For implementations where the diagnostic processor 210 uses software, the on-board memory 220 can store that software. In some implementations, on-board memory 220 can also store any data generated during computation by diagnostic processor 210. Although FIG. 2 shows the on-board memory 220 as being physically separate from DSP 230, in other embodiments the on-board memory be a part of the DSP 230 and operatively coupled with the diagnostic processor 210.

The diagnostic processor 210 can perform its calculations for channel spacing estimation by capturing data from ADC 242 (e.g., via four traces from the ADC 242) and performing a method as the represented by the following pseudo-code:

```
Zi = fft(ADC_data); % Calculates the fft of ADC samples
N_acq = N_acq + 1; % Keep track of the number of acquisitions
P_avg = (P_avg*(N_acq-1) + abs(Z_avg).^2)/N_acq;
P_avg_dB = 10*log10(P_avg); % Converts linear avg power in dB
Right_Ch_dB = P_avg_dB(R_idx) − P_avg_dB(center); % Right ch
Left_Ch_dB = P_avg_dB(L_idx) − P_avg_dB(center); % Left ch
```

For a correct execution of the pseudo code, the user initializes N_acq to zero.

First (as represented by the first line of pseudo code), the block of digital samples ADC_data are converted from the time domain to the frequency domain by Fast Fourier Transform (FFT). For example, the ADC_data block size can be in the range of 16,000 digital samples or as little as 32 digital samples. Second (as represented by the second line of pseudo code), the new acquisition triggers an increment in the number of acquisitions N_acq. Third (as represented by the third line of pseudo code), the square of the absolute value of the FFT values is calculated to obtain the spectral component for a given optical channel (this process can be repeated for multiple optical channels). Such a value is accumulated with the previous value P_avg to calculate the arithmetical average value after each acquisition. Fourth (as represented the fourth line of pseudo code), the average power spectral density estimate is converted into logarithmic scale, expressed in dB units, and stored in the P_avg_dB variable. Fifth (as presented by the fifth line of pseudo code), the ratio between the power spectral density at the zero frequency (center) and the discrete Fourier Transform (DFT) at a proper frequency (R_idx or L_idx) for right and left neighboring channels is calculated respectively. The difference in dB between the central and side frequencies can be converted with a fitting equation into spacing Δs, expressed in GHz. This can be calculated, for example, as function of the roll-off of the pulse. The frequency parameters center, R_idx, and L_idx can be initialized to values that are function of the carrier frequency offset value estimated by the DSP. As mentioned above, once the channel spacing for the various optical channels is calculated by the coherent optical receiver, a diagnostic signal can be sent from the coherent optical receiver to the network management device so that network management device determines a desired or minimal set of channel spacing changes for the plurality of optical channels, as described below.

The network management device receives the diagnostic signal having (or indicating or representing) the channel spacing information. In case two adjacent channels are able to report the relative spacing between them, if both spacings are reported as valid, the network manager device can make an average of the two values to improve the accuracy of the estimate. The channel spacing information can be represented here as $\Delta s_i$; where 'Δs' is the space between two adjacent channels and 'i' is an iterative variable representing the channel under test. This relates to the offset between the estimated spacing $\Delta s_i$ and the target spacing $t_i$ for each channel i. Next, the network management device can calculate the detuning D that satisfy this condition:

$$D_k = C + \sum_{0}^{k} (\Delta s_i - t_i);$$

where Δs is the space between two adjacent channels, 'i' is a iterative variable representing the channel under test, 't' is the target spacing, 'C' is a constant offset and 'D' is the detuning factor. To identify the detuning that involves the minimal number of changes, the network management device can calculate the constant term C that maximizes the number of $D_k=0$. In other words, the network management device can determine the determine the minimal set of channel spacing changes based on the premise that a majority of the channel frequencies should be stable and the smallest set of channel spacing changes is most desirable. Once the minimal set of channel spacing changes is determined, the network management device can send a correction signal to the source coherent optical transmitter so that the source coherent optical transmitter can make adjustment to compensate for the channel spacing. This process can be performed, for example, daily (or hourly or weekly).

The coherent optical receiver 130 can receive optical signals and estimate a degree of asymmetry of a spectrum of the received optical signals. The coherent optical receiver 130 can then transmit an indication of the estimated degree of asymmetry to the network management device 140 via distributed control network 150, and then network management device 140 can provide control signals to the coherent optical transmitter 110 via the distributed control network 150 based on the estimated degree of asymmetry. The coherent optical transmitter 110 can then carry out the desired steps to compensate for the degree of asymmetry related to optical channel(s) in the spectrum.

Figure 3:
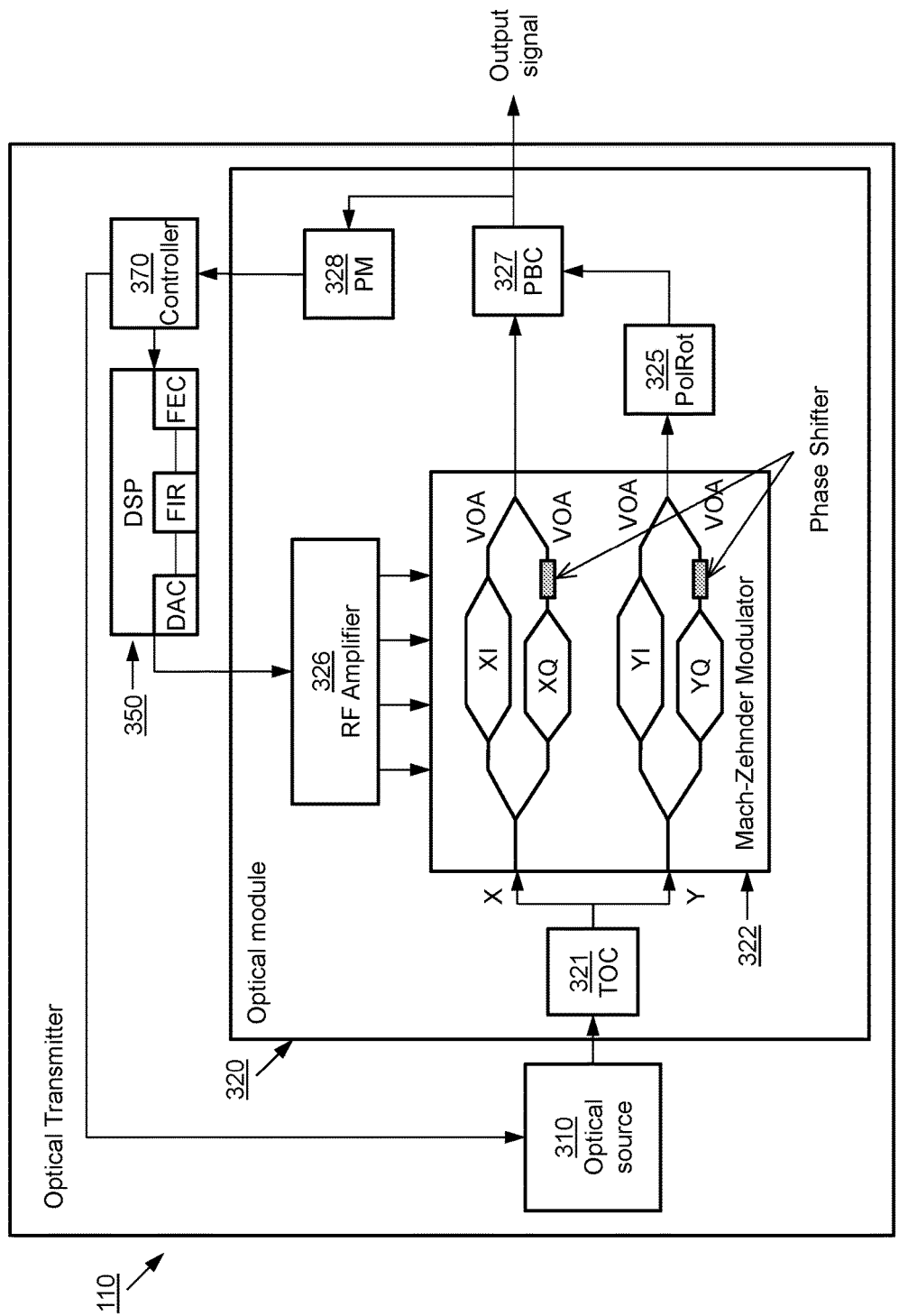
FIG. 3 is a logical block diagram of a coherent optical transmitter, according to an embodiment.

FIG. 3 is a logical block diagram of a coherent optical transmitter, according to an embodiment. The coherent optical transmitter 110 includes an optical source 310, an optical module 320, a digital signal processor (DSP) 350 and a controller 370, which is operatively coupled to the DSP 350 and the optical source 310. Optical transmitter 110 can be implemented using free-space optics, fiber optics, integrated optics (e.g., Si, SiN, Silica, III-V, etc. optics), or the like. Each component of optical transmitter 110 can be operatively coupled to another component of optical transmitter 110.

The optical module 320 further includes a Tunable Optical Coupler (TOC) 321, which is operatively coupled to a Mach-Zehnder Modulator (MZM) 322 (e.g., an optical waveguide). The TOC 321 provides an optical carrier signal as input signal to the MZM 322. Another input, an amplified analog signal, to MZM 322 is provided by radio frequency (RF) amplifier 326. This input is used as a modulating signal to carry out the modulation process in combination with the optical carrier signal. One set of modulated signals output from the MZM 322 has its polarization changed (e.g., from vertical polarization to horizontal polarization) by the polarization rotator 325 (labeled "PolRot" 325 in FIG. 3). The output from the PolRot 325 and the other set of modulated signals output from MZM 322 are then combined using polarization beam combiner (PBC) 327 and transmitted (labeled in FIG. 3 as "Output signal") using optical fiber in the optical communication network (such as the network 160 in FIG. 1). Additional details about the functioning of MZM 322 now described.

The optical beam from the optical source 310 can be generated using, for example, a diode laser. This optical beam is then transmitted to the MZM 322 through the operatively coupled TOC 321. At TOC 321, the optical beam from the optical source 310 is split into two so that the optical beam input into the upper branch (X portion) of the MZM 322 structure, while the optical beam input into the lower branch (Y portion) of the MZM 322 structure. The optical beam at each branch is then further divided into two so that the two portions of each optical beam is sent through the upper and lower arms of each branch of the Mach-Zehnder structure. For example, in Quadrature Phase Shift Keying (QPSK) and Quadrature Amplitude Modulation (QAM), the upper arms of MZM 322 forms the in-phase (I) signal and the lower arms of MZM 322 (passing through a phase shifter, typically $\pi/2$ (i.e., 90-degree phase shift)) form the quadrature (Q) signal.

At the merging point of XI and XQ signal (and similar with YI and YQ), the optical beams undergo a series of encoded phase changes that is directly proportional to the input signal from the RF amplifier 326 to produce a modulated signal for the upper branch of the MZM 322 (and separately produce a modulated signal for the lower branch of the MZM 322). The modulated signal for the upper branch is then directly sent to polarization beam combiner (PBC) 327, while the modulated signal for the lower branch is first sent through polarization rotator (PolRot) 325 to produce polarization-rotated modulated signal that is also received at the PBC 327. Subsequently, at the PBC 327, both sets of modulated signals are combined to produce an output signal (labeled "Output signal" in FIG. 3), which is ready to be transmitted onto the communication network (e.g., network 160 of FIG. 1). Although QPSK and QAM modulation techniques are discussed above, it should be understood that the same MZM structure is not limited to only the QPSK and the QAM modulation and can be used to generate different amplitude/phase/frequency modulation techniques.

A small portion of the output signal is also provided to the power meter (PM) 328, which sends a signal to the controller 370 indicative of the power of the output signal. The controller 370 monitors the signal received from the PM 328 to determine the BER value and determine if the BER value is below the predetermined threshold value. For example, in case when the BER value is below the predetermined threshold value, then at least a portion of the neighboring channel has undesirably frequency shifted to cross-talk or interferes with the optical channel under test, resulting in an unacceptable or undesirable penalty for the optical channel under test. The controller 370, as a corrective action, sets a proper frequency offset (or desired frequency offset or requested frequency offset) that compensates for the frequency shift, which can be due to for example the drift of the laser source over time or temperature changes. The controller 370 can then send a signal indicative of the frequency offset to DSP 350. As a result of the corrective action (e.g., executed by the device that received the signal indicative of the frequency offset), the drift in the laser source can be compensated and set back to a desired frequency (e.g., the originally set frequency or an alternative frequency), reducing the transmission penalty. The controller 370, via the signal indicative of the frequency offset, instructs the digital signal processor (DSP) 350 to modify the information provided to RF amplifier 326. In some implementations, DSP 350 can include a forward error correction (FEC), a finite impulse response (FIR) filter, and a digital-to-analogue converter (DAC). Each component of the FEC, the FIR filter, and the DAC can be operatively coupled with another component of DSP. In some implementations, DSP can include components (not shown in FIG. 3) in addition to FEC, FIR filter, and DAC. Such components together with FEC, FIR filter, and DAC can perform signal processing such as spectral shaping, equalizing for optical and electrical impairments, and other such signal processing for various needs. The coherent optical transmitter 110 is thus able to overcome or compensate for the BER penalty caused by the drift in the frequency of the optical source 310.

Controller 370 can include components and/or circuitry configured to control properties of an optical signal and/or send control signals to one or more components of optical transmitter 110. For example, controller 307 can send control signals to and thus control properties of one or more components within DSP 350 and/or one or more components within optical module 320. In some implementations, controller 307 can receive, from PM 328, signals associated with power measurements (e.g., a power imbalance) associated with an optical signal. Based on the received power measurements, controller 370 can generate control signals and send the control signals to a component(s) within DSP 350 and/or within optical module 320 to compensate for the power imbalance. In some implementations, controller 370 is a hardware device and/or software (executed on a processor) external to optical module 320.

DSP 350 can be or can include a general purpose processor, a field-programmable gate array (FPGA), an application specific integrated circuit (ASIC), a Digital Signal Processing (DSP) chip, a combination thereof, or other equivalent integrated or discrete logic circuity. DSP 350 can receive control signals from controller 370 and send electrical signals to optical module 320 (e.g., a radio frequency (RF) amplifier 326). In some implementations, DSP 350 can be a hardware device external to optical module 320. In other implementations, DSP 350 can be a hardware device within optical module 320.

Although not shown in FIG. 3, the coherent optical transmitter 110 can receive a correction signal from the network management device (e.g., network management device 140 of FIG. 1) in response to which the coherent optical transmitter 110 can make adjustments to compensate for the channel spacing. For example, the controller 370 can receive the correction signal from a network management device and then use that correction signal to determine an adjustment for optical source 310. Controller 370 can provide adjustment information to optical source 310 such that optical source 310 can compensate for channel spacing as described herein.

As mentioned above, the optical signals associated with optical channel(s) received at the coherent optical receiver 130 in the FIG. 2 are continuous time-varying signals (i.e., time-domain signals). The calculations performed during the digital signal processing by the diagnostic processor 210 in FIG. 2 include converting the time-domain signals into corresponding frequency-domain using Fast Fourier Transform (FFT). The optical channels each has a highest amplitude at the central frequency of the optical channel (i.e., the frequency of the optical source for that optical channel), and the amplitude for that optical channel decreases as the frequency is further away from the central frequency of that optical channel. As shown below in FIG. 5 and its related discussion, the graph of FFT plotted against the frequency provides the representation of the neighboring adjacent channels and the potential occurrence of the cross-talk penalty.

Figure 4:
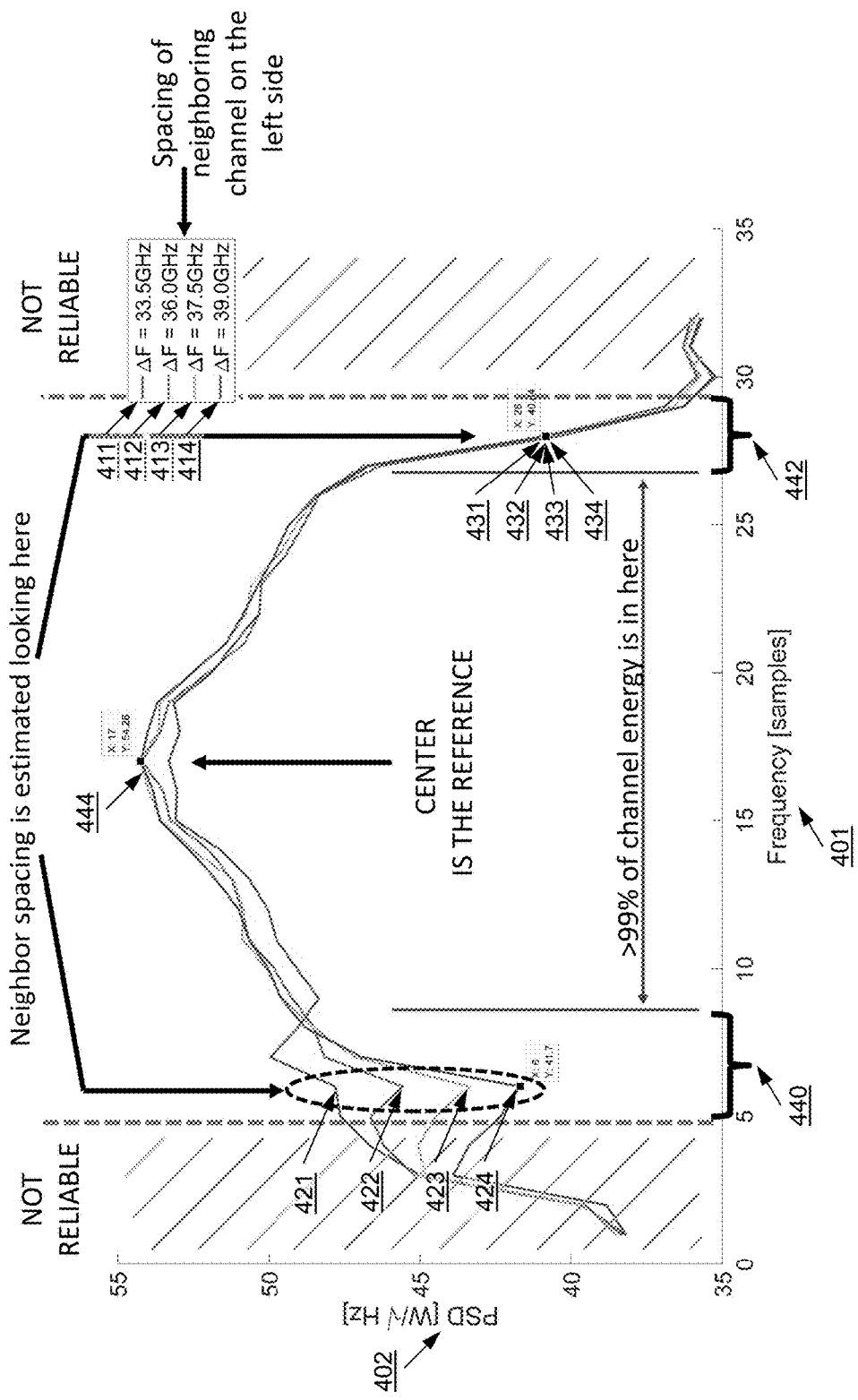
FIG. 4 illustrates an example of a graph of power spectral density versus frequency, according to an embodiment.

FIG. 4 illustrates an example of a graph of power spectral density versus frequency, according to an embodiment. The graph illustrates power spectral density versus frequency, using Fast Fourier Transform (FFT) (32 samples) of two adjacent channels with varying channel spacing. The Y-axis 402 in the FIG. 4 represents power spectral density (PSD) in units of W/√Hz, and the X-axis 401 in the FIG. 4 represents frequency samples. Four different cases of varying channel spacing are the following: channel spacing 411 corresponds to 33.5 GHz; channel spacing 412 corresponds to 36.0 GHz; channel spacing 413 corresponds to 37.5 GHz; channel spacing 414 corresponds to 39.0 GHz. The frequency of the channel selected for monitoring is considered as the reference center 444 for the measurements of the adjacent channel spacing. The left side region 440 is used for the estimation of neighboring channel space on the left. The right side region 442 is used for the estimation of neighboring channel space on the right. The left-side estimation of the neighboring channel space 421-424 shows that the value of PSD is inversely proportional to the channel spacing; for example, when the channel spacing is 39.0 GHz (414) then the PSD (424) is lowest and when the channel spacing is decreased to 33.5 GHz (411) then the PSD (421) increases. This shows that the neighboring channel coming in-band (for example, 421) increases the risk of cross-talk penalty. In FIG. 4, the right neighboring channel (442) is absent and thus, PSD is the same for all the four channel spacing (431-434) in this example.

Figure 5:
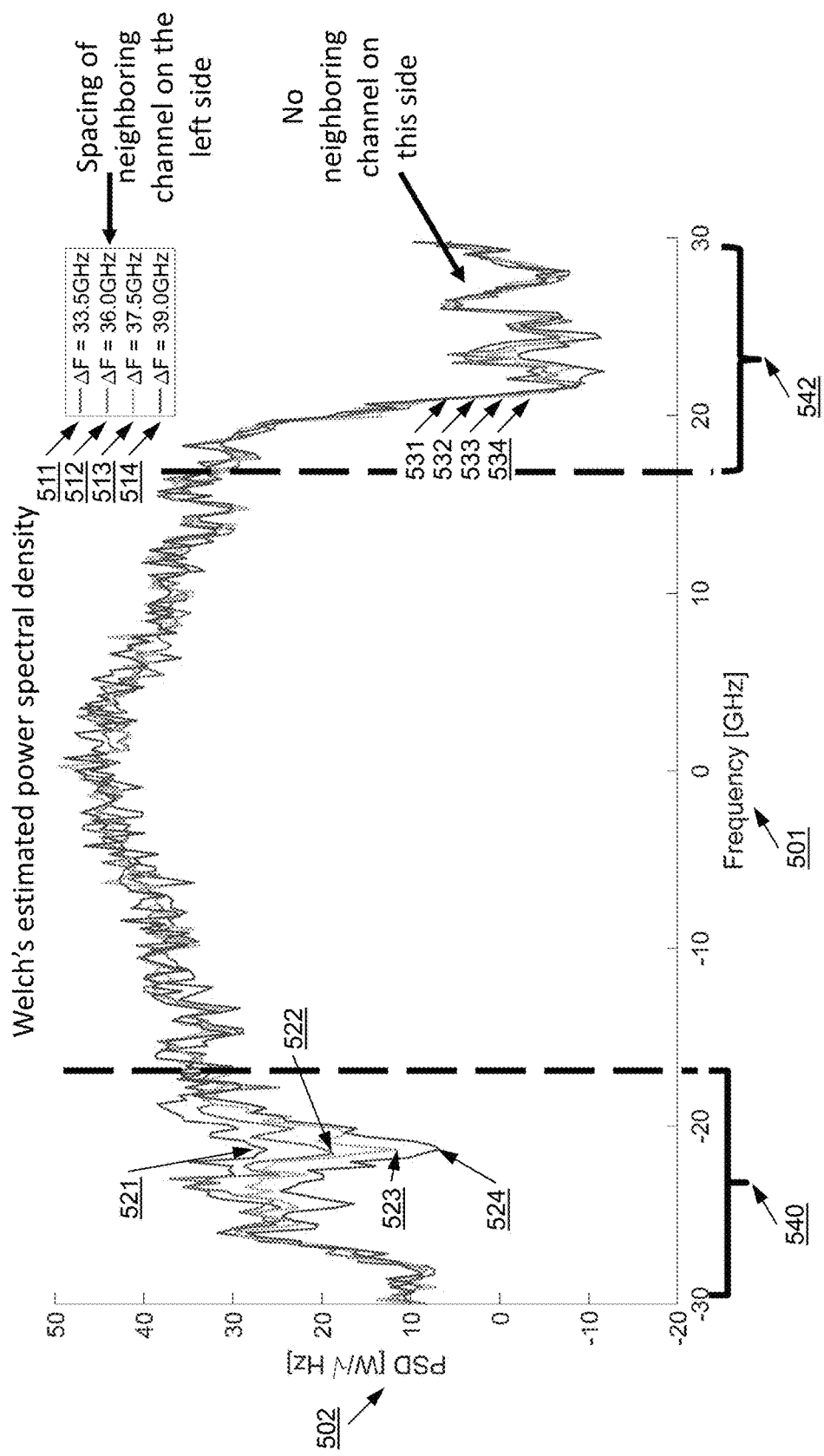
FIG. 5 illustrates an example of a graph of Welch's estimated power spectral density versus frequency, according to an embodiment.

One way to characterize the extent to which channel spacing has occurred is by measuring the power spectral density (PSD) of the received optical signals at the coherent optical receiver (such as the coherent optical receiver 130 of FIG. 2). PSD can represent the effect of the reduced channel spacing due to the carrier frequency offset and/or the occurrence of cross-talk penalty in dense neighboring channels. FIG. 5 illustrates an example of a graph of Welch's estimated power spectral density versus frequency, according to an embodiment. The Y-axis 502 in the FIG. 5 represents Welch's estimated power spectral density in units of W/√Hz and the X-axis 501 in the FIG. 5 represents frequency in units of GHz. Four different representations of varying channel spacing are; channel spacing 511 corresponds to 33.5 GHz; channel spacing 512 corresponds to 36.0 GHz; channel spacing 513 corresponds to 37.5 GHz; channel spacing 514 corresponds to 39.0 GHz. The left side region 540 is used for the estimation of neighboring channel space on the left. The right side region 542 is used for the estimation of neighboring channel space on the right. The left-side estimation of the neighboring channel space 521-524 shows that the value of Welch's estimated power spectral density is inversely proportional to the channel spacing; for example, when the channel spacing is 39.0 GHz (514) then the Welch's estimated power spectral density (424) is lowest and when the channel spacing is decreased to 33.5 GHz (511) then the Welch's estimated power spectral density (521) increases. This shows that the neighboring channel coming in-band (for example, 521) increases the risk of cross-talk penalty. In FIG. 5, the right neighboring channel (542) is absent and thus, Welch's estimated power spectral density is nearly the same for all the four channel spacing (531-534). As shown in FIG. 5, the PSD can represent that reduced channel spacing can be used to determine the drift in the carrier frequency of the channel and the potential occurrence of cross-talk penalty among adjacent neighboring channels.

Figure 6:
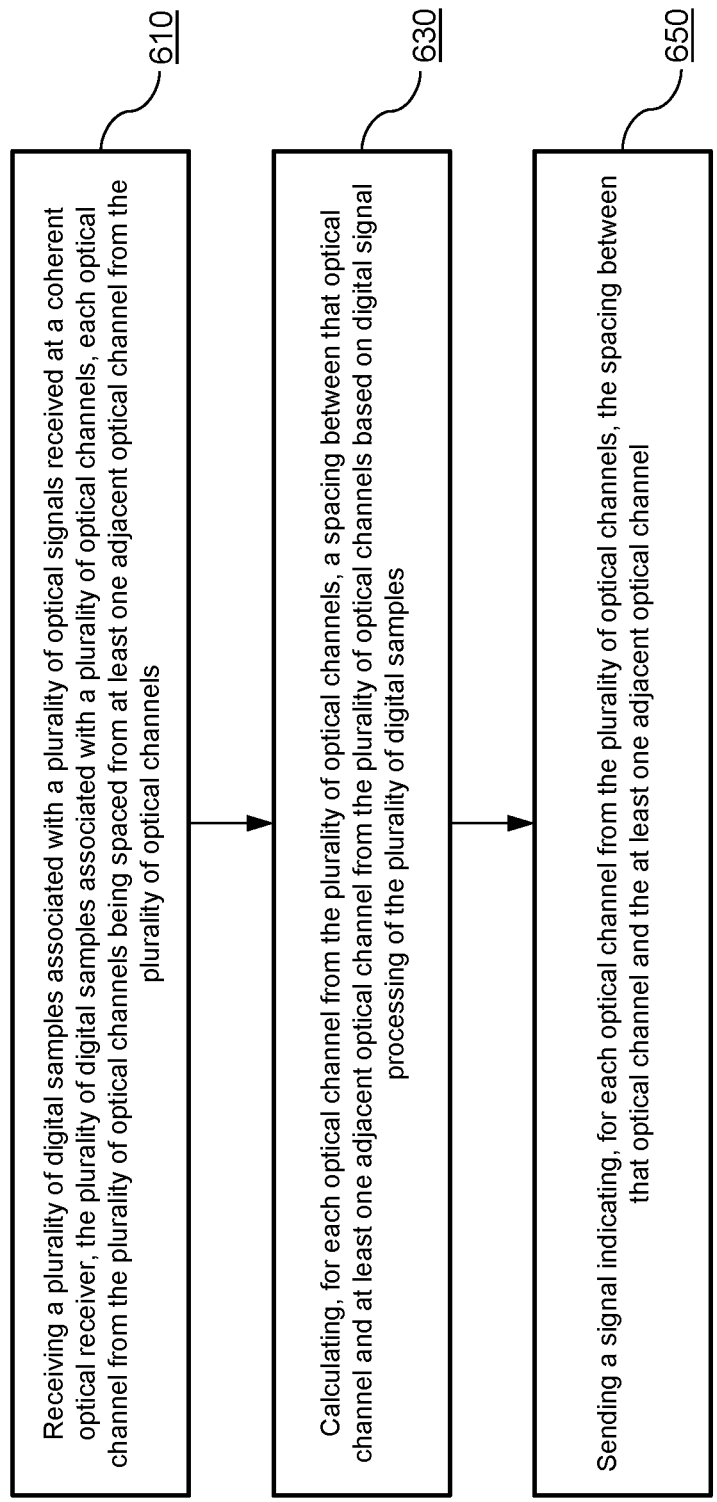
FIG. 6 illustrates a flow chart showing example technique in accordance with one or more embodiments of this disclosure.

FIG. 6 illustrates a flow chart showing example technique in accordance with one or more embodiments of this disclosure. For example, FIG. 6 can be performed to monitor the adjacent channel penalty at coherent optical receiver such as the coherent optical receiver 130 illustrated and described with respect to FIGS. 1 and 2.

At 610, the method includes receiving, at a coherent optical receiver, multiple digital samples associated with a multiple optical signals. The multiple digital samples are associated with a multiple optical channels. Each optical channel from the multiple optical channels is spaced from at least one adjacent optical channel from the multiple optical channels. For example, for the coherent optical receiver 130 of FIG. 2, the diagnostic processor 210 receives multiple digital samples associated with multiple optical signals from ADC 242 via on-board memory 220. These multiple digital samples are associated with a multiple optical channels and each optical channel from the multiple optical channels is spaced from at least one adjacent optical channel from the multiple optical channels.

At 630, for each optical channel from the multiple optical channels, a spacing between that optical channel and at least one adjacent optical channel from the multiple optical channels is calculated based on digital signal processing of the multiple digital samples. For example, for the coherent optical receiver 130 of FIG. 2, for each received optical channel from the multiple optical channels, a spacing between that optical channel and at least one adjacent optical channel from the multiple optical channels is calculated by diagnostic processor 210 based on digital signal processing of the multiple digital samples.

At 650, a signal indicating, for each optical channel from the multiple optical channels, the spacing between that optical channel and the at least one adjacent optical channel is sent. For example, the coherent optical receiver 130 of FIG. 2 can send a diagnostic signal indicating the spacing between that optical channel and the at least one adjacent optical channel for each optical channel from the multiple optical channels. This diagnostic signal can be sent to a network management device (e.g., the network management device 140 of FIG. 1), such that the network management device can determine a minimal set of spacing changes for the plurality of optical channels. Based on this determined minimal set of spacing changes, the network management device can send a control signal to a coherent optical transmitter (e.g., the coherent optical transmitter of FIG. 3), which can then make adjustments to the center frequency of the designated optical channel(s) based on the control signal.

Figure 7:
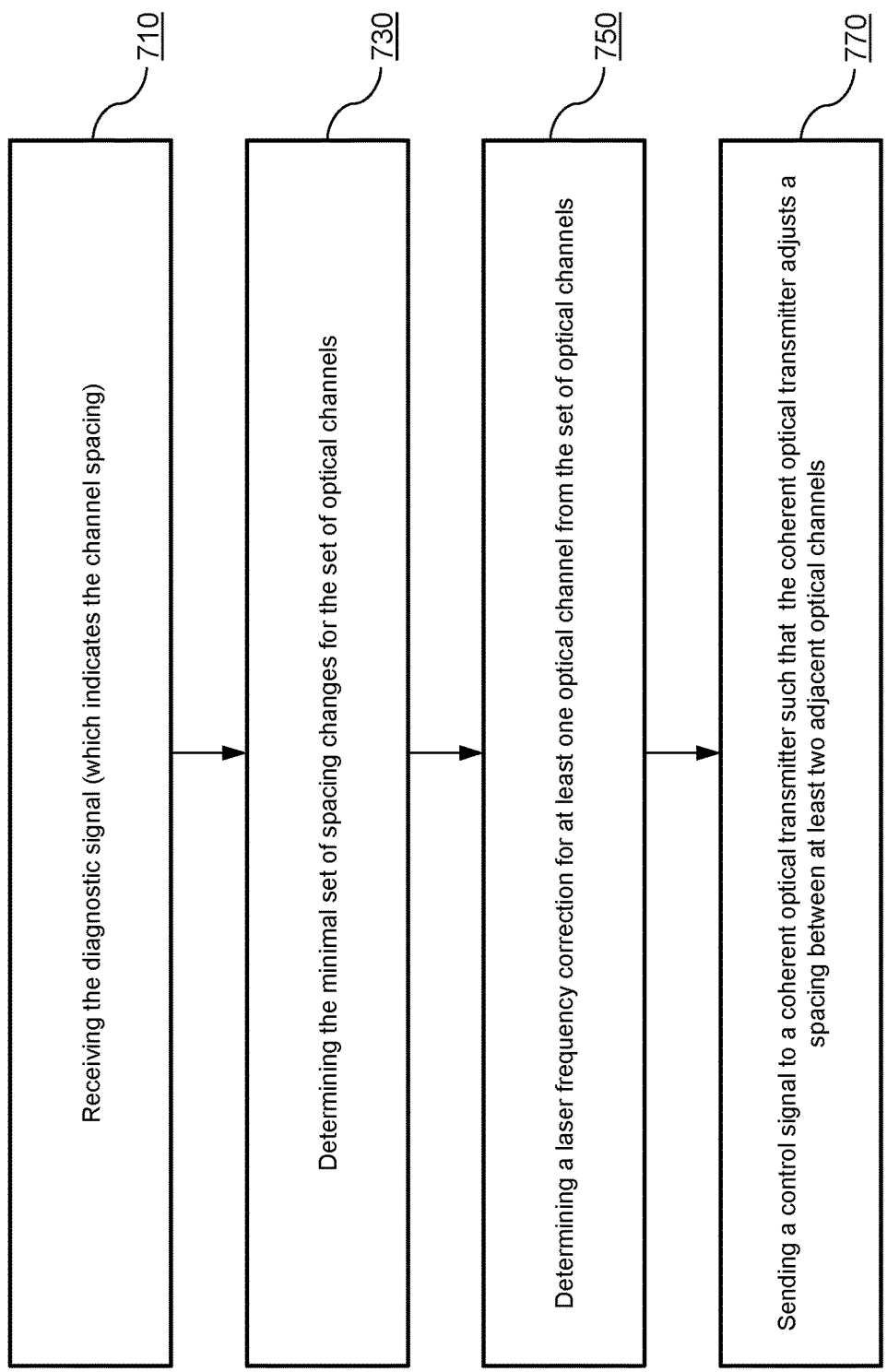
FIG. 7 illustrates a flow chart showing another example technique in accordance with one or more embodiments of this disclosure.

FIG. 7 illustrates a flow chart showing another example technique in accordance with one or more embodiments of this disclosure. For example, FIG. 7 can be performed by a network management device to estimate and correct the adjacent channel penalty within a coherent optical transmitter. The network management device can be for example network management device 140 of FIG. 1, and the coherent optical transmitter can be coherent optical transmitter 110 of FIG. 1.

At 710, the method includes receiving the diagnostic signal, which indicates (or represents) the channel spacing of the optical channels for optical signals received at a coherent optical receiver. For example, the network management device 140 in FIG. 1 can receive from coherent optical receiver 130 the diagnostic signal, which indicates the channel spacing of the set of optical channels for optical signals received at a coherent optical receiver 130.

At 730, the method further includes determining the minimal set of spacing changes for the set of optical channels. For example, the network management device 140 of FIG. 1 determines (or estimates) the minimal set of spacing changes for the set of optical channels for optical signals received at a coherent optical receiver 130.

At 750, for at least one optical channel from the set of optical channels, laser frequency correction is determined. For example, the network management device 140 of FIG. 1 determines (or estimates) the laser frequency correction for at least one optical channel from the set of optical channels.

At 770, a control signal is sent to a coherent optical transmitter such that the coherent optical transmitter adjusts the spacing between at least two adjacent optical channels based on a control signal. For example, the network management device 140 of FIG. 1 can send a control signal to the coherent optical transmitter 110 and, based on the control signal, the coherent optical transmitter 110 can adjust the spacing between at least two adjacent optical channels. As a result, when the coherent optical transmitter 110 next sends optical signals to coherent optical receiver 130, these optical signals will be sent over the set of optical channels having the adjusted channel spacing(s) such that the performance should be improved and penalties such as cross talk should be reduced.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or microinstructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

What is claimed is:

1. An apparatus, comprising:
a processor configured to receive a plurality of digital samples associated with a plurality of optical signals received at a coherent optical receiver, the plurality of digital samples associated with a plurality of optical channels, each optical channel from the plurality of optical channels being spaced from at least one adjacent optical channel from the plurality of optical channels,
the processor configured to calculate, for each optical channel from the plurality of optical channels, a spacing between that optical channel and at least one adjacent optical channel from the plurality of optical channels based on digital signal processing of the plurality of digital samples,
the processor configured to send to a network management device a signal indicating, for each optical channel from the plurality of optical channels, the spacing between that optical channel and the at least one adjacent optical channel such that the network management device determines a laser frequency correction for at least one optical channel from the plurality of optical channels and causes a coherent optical transmitter to adjust a spacing between the at least one optical channel and an adjacent optical channel from the plurality of optical channels based on the laser frequency correction.

2. The apparatus of claim 1, wherein the processor is configured to calculate, for each optical channel from the plurality of optical channels, the spacing between that optical channel and the at least one adjacent optical channel without calculating a spacing between that optical channel and a non-adjacent optical channel from the plurality of optical channels.

3. The apparatus of claim 1, wherein:
the processor is configured to calculate a spacing for each optical channel from the plurality of optical channels between that optical channel and a first adjacent optical channel from the plurality of optical channels and between that optical channel and a second adjacent optical channel from the plurality of optical channels,
the processor configured to send the signal to the network management device such that the network management device determines a minimal set of spacing changes for the plurality of optical channels.

4. The apparatus of claim 1, wherein:
the processor is configured to receive the plurality of digital samples from an optical module having at least one analog-digital converter (ADC) and a digital signal processor (DSP), the processor configured to receive the plurality of digital signals from an on-board memory associated with the ADC and not from the DSP.

5. The apparatus of claim 1, wherein the processor is configured to send the signal to the network management device operatively coupled to the coherent optical transmitter that sent the plurality of optical signals to the coherent optical receiver.

6. The apparatus of claim 1, wherein:
the signal is a first signal,
the processor is configured to send the first signal to the network management device operatively coupled to the coherent optical transmitter that sent the plurality of optical signals to the coherent optical receiver, such that the network management device sends a second signal to the coherent optical transmitter based on the first signal to cause the coherent optical transmitter to adjust the spacing between the at least one optical channel and the adjacent optical channel.

7. An apparatus, comprising:
a network management device operatively coupled to a processor that receives a plurality of digital samples associated with a plurality of optical signals received at a coherent optical receiver, the plurality of digital samples associated with a plurality of optical channels, each optical channel from the plurality of optical channels being spaced from at least one adjacent optical channel from the plurality of optical channels,
the network management device configured to receive from the processor a signal indicating, for each optical channel from the plurality of optical channels, the spacing between that optical channel and the at least one adjacent optical channel based on digital signal processing of the plurality of digital samples calculated at the processor,
the network management device is configured to calculate a minimal set of spacing changes for the plurality of optical channels based on the signal and to cause a coherent optical transmitter to adjust a spacing between at least two adjacent optical channels from the plurality of optical channels.

8. The apparatus of claim 7, wherein the network management device is configured to receive the signal from the processor that calculated, for each optical channel from the plurality of optical channels, the spacing between that optical channel and the at least one adjacent optical channel without calculating a spacing between that optical channel and a non-adjacent optical channel from the plurality of optical channels.

9. The apparatus of claim 7, wherein:
the network management device is configured to receive the signal from the processor that received the plurality of digital samples from an on-board memory of an optical module having at least one analog-digital converter (ADC) and a digital signal processor (DSP).

10. The apparatus of claim 7, wherein the network management device is configured to be operatively coupled to the coherent optical transmitter that sent the plurality of optical signals to the coherent optical receiver.

11. The apparatus of claim 7, wherein:
the signal is a first signal,
the network management device is configured to be operatively coupled to the coherent optical transmitter that sent the plurality of optical signals to the coherent optical receiver,
the network management device further configured to send a second signal to the coherent optical transmitter based on the first signal to cause the coherent optical transmitter to adjust the spacing between the at least two adjacent optical channels.

12. A method, comprising:
receiving a plurality of digital samples associated with a plurality of optical signals received at a coherent optical receiver, the plurality of digital samples associated with a plurality of optical channels, each optical channel from the plurality of optical channels being spaced from at least one adjacent optical channel from the plurality of optical channels;
calculating, for each optical channel from the plurality of optical channels, a spacing between that optical channel and at least one adjacent optical channel from the plurality of optical channels based on digital signal processing of the plurality of digital samples; and
sending a signal indicating, for each optical channel from the plurality of optical channels, the spacing between that optical channel and the at least one adjacent optical channel,
the sending includes sending the signal to a network management device operatively coupled to a coherent optical transmitter that sent the received plurality of optical signal causing the coherent optical transmitter to adjust a spacing between at least two adjacent optical channels.

13. The method of claim 12, wherein the calculating, for each optical channel from the plurality of optical channels, the spacing between that optical channel and the at least one adjacent optical channel is performed without calculating a spacing between that optical channel and a non-adjacent optical channel from the plurality of optical channels.

14. The method of claim 12, wherein:
the calculating includes calculating the spacing for each optical channel from the plurality of optical channels between that optical channel and a first adjacent optical channel from the plurality of optical channels and between that optical channel and a second adjacent optical channel from the plurality of optical channels,
the sending the signal includes sending the signal to the network management device such that the network management device determines a minimal set of spacing changes for the plurality of optical channels.

15. The method of claim 12, wherein the sending the signal includes sending the signal to the network management device such that the network management device determines a laser frequency correction for at least one optical channel from the plurality of optical channels.

16. The method of claim 12, wherein:
the receiving includes receiving the plurality of digital samples from an optical module having at least one analog-digital converter (ADC) and a digital signal processor (DSP), the processor configured to receive the plurality of digital signals from an on-board memory associated with the ADC and not from the DSP.

17. The method of claim 12, wherein:
the signal is a first signal,
the sending includes sending the first signal to the network management device operatively coupled to the coherent optical transmitter that sent the received plurality of optical signals, such that the network management device sends a second signal to the coherent optical transmitter based on the first signal to cause the coherent optical transmitter to adjust the spacing between the at least two adjacent optical channels.

* * * * *